(12) United States Patent
Marusinec (10) Patent No.: US 10,528,432 B2
(45) Date of Patent: Jan. 7, 2020

(54) OFF-SITE BACKUP NETWORK DISK

(71) Applicant: SAP SE, Walldorf (DE)

(72) Inventor: Milan Marusinec, Bratislava (SK)

(73) Assignee: SAP SE, Walldorf (DE)

( * ) Notice: Subject to any disclaimer, the term of this patent is extended or adjusted under 35 U.S.C. 154(b) by 224 days.

(21) Appl. No.: 15/279,085

(22) Filed: Sep. 28, 2016

(65) Prior Publication Data

US 2018/0089036 A1 Mar. 29, 2018

(51) Int. Cl.
*G06F 17/30* (2006.01)
*G06F 11/14* (2006.01)
*G06F 16/27* (2019.01)

(52) U.S. Cl.
CPC ........ *G06F 11/1464* (2013.01); *G06F 16/278* (2019.01)

(58) Field of Classification Search
USPC ........ 707/607, 609, 687, 705, 790, 813, 821
See application file for complete search history.

(56) References Cited

U.S. PATENT DOCUMENTS

| 6,865,598 | B2 | 3/2005 | Watkins et al. |
| 9,110,601 | B2 | 8/2015 | Vorsprach et al. |
| 9,262,323 | B1 * | 2/2016 | Shankaran ............ G06F 16/184 |
| 2006/0013219 | A1 | 1/2006 | Neilson et al. |
| 2006/0075063 | A1 | 4/2006 | Grosse et al. |
| 2007/0288247 | A1 * | 12/2007 | Mackay ................. G06Q 10/00 705/1.1 |
| 2008/0126445 | A1 | 5/2008 | Michelman |
| 2008/0147821 | A1 * | 6/2008 | Dietrich ............... H04L 63/104 709/216 |
| 2009/0222509 | A1 * | 9/2009 | King ..................... G06F 16/182 709/203 |
| 2013/0117221 | A1 | 5/2013 | Thomsen et al. |
| 2014/0164776 | A1 * | 6/2014 | Hook ........................ H04L 9/14 713/171 |
| 2014/0179229 | A1 * | 6/2014 | Lin ........................ H04W 8/005 455/41.2 |
| 2014/0289202 | A1 * | 9/2014 | Chan ........................ G06F 9/54 707/652 |

OTHER PUBLICATIONS

Christopher Batten et al., "pStore: A Secure Peer-to-Peer Backup System," Distributed Computer Systems, 2001, 12 pages.

* cited by examiner

*Primary Examiner* — Sana A Al-Hashemi
(74) *Attorney, Agent, or Firm* — Sterne, Kessler, Goldstein & Fox P.L.L.C.

(57) ABSTRACT

Code block and test script debugging suggestion is discussed herein. An embodiment operates by receiving, by at least one processor, a data backup request from a first data client; determining, by at least one processor, a second data client to store data from the first data client; and issuing, by at least one processor, a peer-to-peer initialization request to the first and second data clients, wherein the peer-to-peer initialization request is based on the data backup request; wherein the first and second data clients are configured to establish peer-to-peer communications between the first and second data clients in response to the peer-to-peer initialization request.

17 Claims, 5 Drawing Sheets

OFF-SITE BACKUP NETWORK DISK

BACKGROUND

With the rise of technology has come the importance of having a backup of critical data. In current systems, files may be deleted accidentally or server hardware failures may cause critical data to become damaged or lost. Due to this, solutions to give the ability to restore data from nearby media, such as backup harddrive, have developed. However, such solutions come at a serious risk as such a backup is not completely safe. While these types of systems protect critical data, it provides little protection against physical events such as a home or office catching fire, flooding, theft, or damage. Such systems force a user to rely on a backup that has a single point of failure. Any damage or theft that occurs at a home or office could destroy all copies of important data.

Because of this, off-site backup systems have become an important consideration. An off-site backup is a backup for files at a different physical locale, or off-site, from the original files. These systems prevent a total loss of critical data even if a home or office burns down and everything is destroyed, as there will be a copy of critical data at the second physical locale. However, such systems are costly as the storage is usually centralized and managed by one provider. This leaves users with either incurring more costs if they wish to backup data at different physical locales or be limited to the physical locations of the off-site backup provider.

BRIEF DESCRIPTION OF THE DRAWINGS

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, method and/or computer program product embodiments, and/or combinations and sub-combinations thereof, for off-site data backup.

Figure 1:
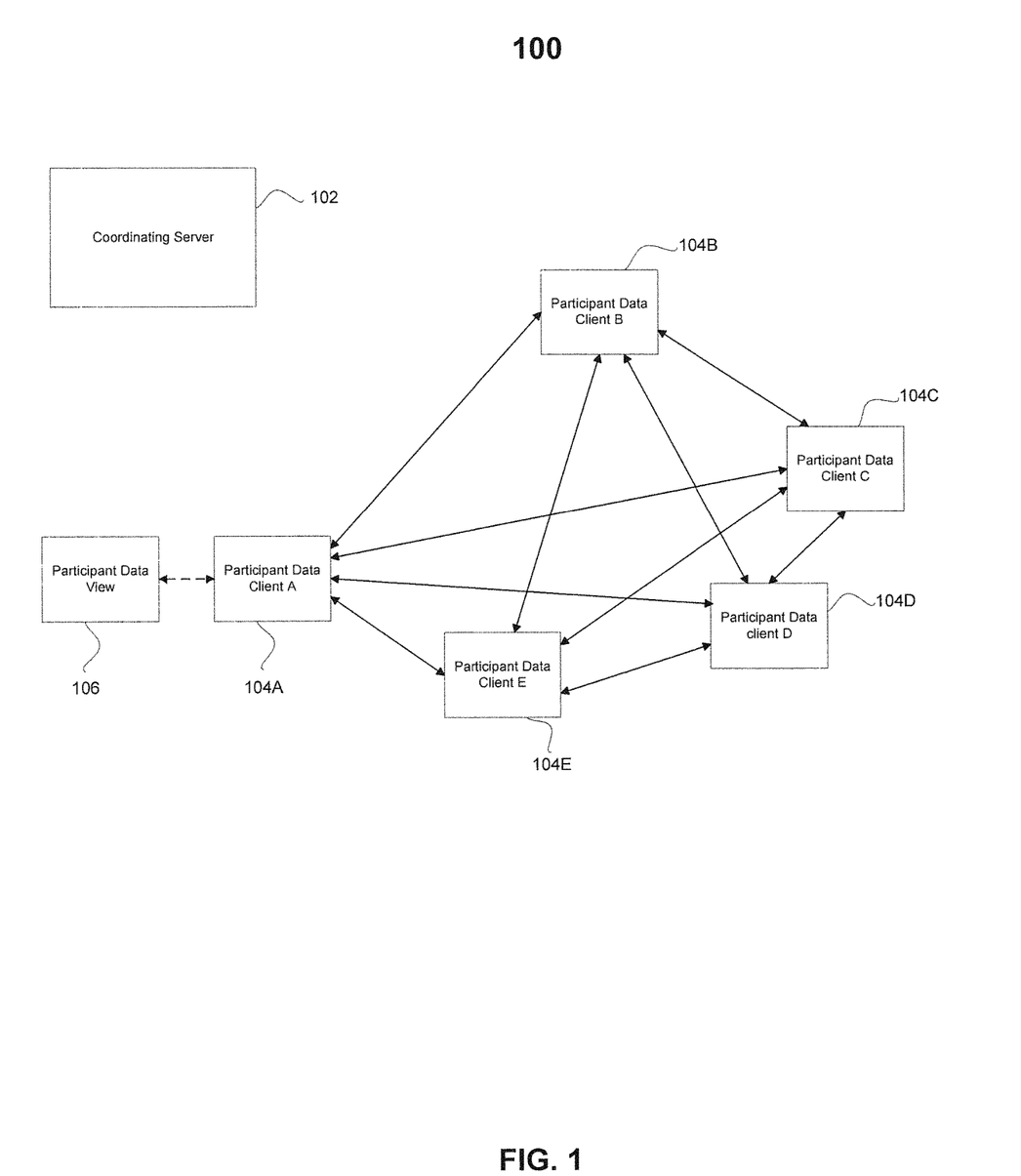
FIG. 1 is a block diagram of a system for off-site network disk 100, according to some embodiments.

FIG. 1 is a block diagram of a system for off-site backup network disk 100, according to some embodiments.

According to an embodiment off-site backup network disk 100 may comprise coordinating server 102, participant data clients 104 (comprising participant data client A 104A, participant data client B 104B, participant data client C 104C, participant data client D 104D, and participant data client E 104E), and participant data view 106. In an embodiment, coordinating server 102 may control the access, client information, storage, location—or any combination thereof—of data across the participant data clients 104. Coordinating server 102 may comprise one or more computer program products, processors, computers, microprocessors, storage, memory—or any combination thereof—that provides functionality for participant data clients 104.

In an embodiment, coordinating server 102 may be connected to participant data clients 104 via a wired connection, a fiber connection, an Ethernet connection, an intranet connection, a wireless connection, an internet connection, a Wi-Fi connection, or any combination thereof—to name a few examples. According to an embodiment, participant data clients 104 may comprise computer program products, processors, computers, microprocessors, mobile devices, smart phones, or any combination thereof—to name a few examples. In an embodiment, each participant data client of participant data clients 104 may be connected to each other participant data client of participant data clients 104 via a wired connection, a fiber connection, an Ethernet connection, an intranet connection, a wireless connection, an internet connection, a Wi-Fi connection, or any combination thereof—to name a few examples. For example, participant data client A 104A may be connected to participant data client B 104B, participant data client C 104C, participant data client D 104D, and participant data client E 104E via an interne connection.

According to an embodiment, each participant data client of participant data clients 104 may comprise a storage. The storage may comprise an HDD, SSD, RAM, PROM, EERPOM, ROM, flash memory, or any combination thereof to name a few examples.

According to an embodiment, coordinating server 102 may receive a client authorization request from a participant data client. The client authorization request may comprise an IP address, MAC address, client data, authorization data, user data, password data—or any combination thereof—of the participant data client, to name a few examples. For example, coordinating server 102 may receive a client authorization request from participant data client 104A comprising the user data and password data of participant data client 104A. In an embodiment, coordinating server 102 may authorize a participant data client based upon the client authorization request received. Coordinating server 102 may authorize a participant data client if the authorization request received matches data stored in an authorization list. The authorization list may comprise data identifying IP addresses, MAC addresses, client data, authorization data, user data, password data—or any combination thereof.

In an embodiment, coordinating server 102 may store data identifying IP addresses, MAC addresses, client data, authorization data, user data, password data or any combination thereof—received from a participant data client.

According to an embodiment, coordinating server 102 may receive a backup data request from a participant data client. A backup data request may comprise data comprising a request to backup specified data stored on a participant data client. Data stored on the participant data client may comprise files, applications, tables, vectors, columns, rows—or any combination thereof—to name a few examples. For example, coordinating server 102 may receive a backup data request from participant data client A 104A comprising a request to store specific files stored on participant data client A 104A.

In an embodiment, coordinating server 102, in response to receiving a data backup request from a participant data client, may coordinate the storage of copies of the data specified by the data backup request. The coordination may comprise a process for storing copies of the specified data in the storage of other participant data clients in the system, as explained in FIG. 2.

According to an embodiment, copies of the specified data stored on other participant data clients in the system may be accessed or downloaded using a web-interface, mobile data client, application, or any combination thereof—to name a few examples.

In an embodiment, a participant data client may be connected to participant data view 106. Participant data view 106 may comprise a tablet, a smart phone, a computer, an application, a computer program product—or any combination thereof. Participant data 106 view may be connected to a participant data client via internet, intranet, wired connections, wireless connections, cellular services, WIFI, Ethernet connections, fiber connections—or any combination thereof For example, participant data client A 104A may be connected to participant data view 106 via a WIFI connection.

According to an embodiment, participant data view 106 may visualize and display the files stored on the connected participant data client. For example, participant data view 106 may visualize and display the filed stored on participant data client 104A. According to an embodiment, participant data view 106 may further visualize and display the locations of files copied from the connected participant data client and stored on other participant data clients, as discussed in FIG. 2. Participant data view 106 may determines the locations of filed copied from the connected participant data client based upon communications of the connected participant data client with other participant data clients in the system, information from coordinating server 106, or information from the other participant data clients to name a few examples.

For example, based upon the communications of participant data client A 104A with other participant data clients, participant data view 106 may visualize and display the files stored on participant data client A 104A and the locations of the participant data clients that store copies of files from participant data client A 104A.

According to an embodiment, participant data view 106 may visualize and display the locations of files copied from the connected participant data client on a map. The map may comprise a representation of a specific area, a global area, a country, a building—or any combination thereof—to name a few examples. For example, participant data view 106 may visualize and display the locations of files copied from the connected participant data client on a global map.

Figure 2:
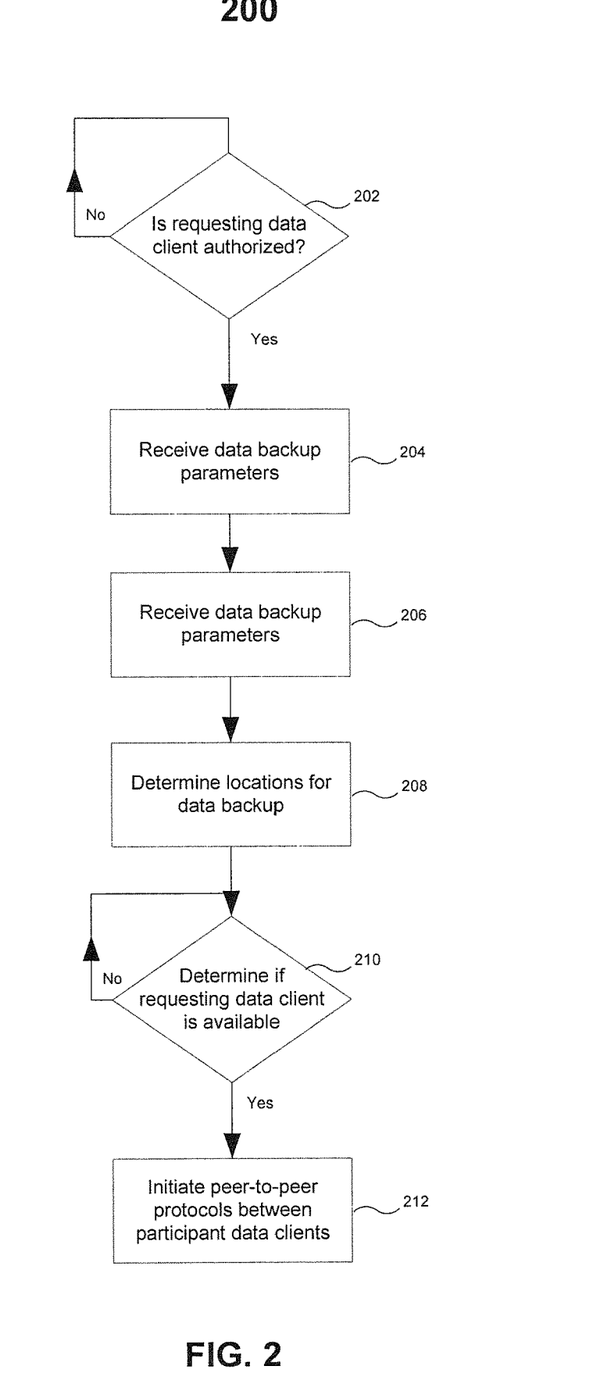
FIG. 2 is a flowchart illustrating a process for coordinating peer-to-peer file backups, according to some embodiments.

FIG. 2 is a flowchart illustrating a process for coordinating peer-to-peer file backups.

At 202, coordinating server 102 may receive a data backup request from a participant data client. In an embodiment, coordination server 102 may compare the data backup request to an authorization list to determine if the requesting participant data client is authorized. If the requesting participant data client is not authorized, then 202 is repeated, otherwise the system may move to 204.

In another embodiment, if the requesting participant data client is not authorized, coordinating server 102 may store data from the data backup quest in the authorization list and repeat 202.

At 204, the requesting participant data client may receive data backup parameters. According to an embodiment, data backup parameters may comprise specified data to be backed up, amount of data to be backed up, a number of backups requested, amount of available storage on the requesting participant data client, or any combination thereof—to name a few examples. The data backup parameters may be received as gestures on a touchscreen, strokes on a key board, text, mouse clicks, mouse drags, interactions with a user interface, or any combination thereof—to name a few examples. In an embodiment, the data backup parameters may be sent to coordinating server 102.

According to an embodiment, the requesting participant data client may determine the maximum amount of data—or maximum backup space—that the requesting participant data client may request to be backed up by the system. The backup space may be determined according to the following equation:

$$\text{Maximum Backup space} = (\text{available storage on requesting participant data client})/(\text{number of backups requested} + 1)$$

For example, the requesting participant data client may receive data backup parameters identifying that there is 500 GB of available storage and the data is to be backed up 4 times. From EQ1, the requesting participant data client may determine that the maximum backup space is 100 GB—or 500/5.

In an embodiment, the requesting participant data client may determine the amount of storage on the requesting participant data client needed to fulfill the data backup request based on the data backup parameters. The amount of storage needed may be determined according to the following equation:

$$\text{Amount of storage needed} = (\text{amount of data to be backed up}) * (\text{number of backups requested} + 1)$$

For example, the requesting participant data client may receive data backup parameters comprising that 50 GB of data is to be backed up and the data is to be backed up 5 times. From EQ2, the requesting participant data client may determine that the amount of storage needed on the request participant data client is 300 GB—or 50*(5+1).

Figure 3:
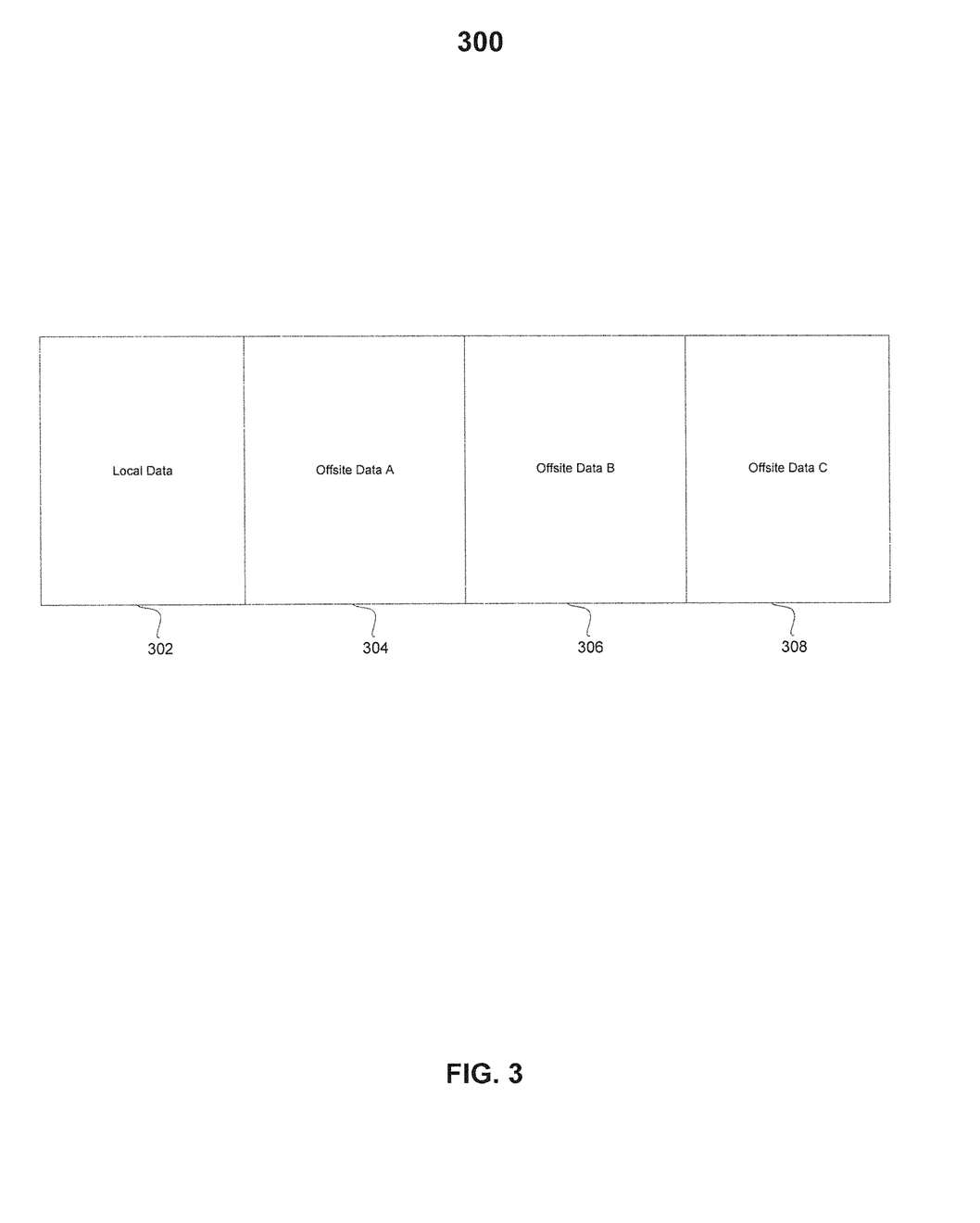
FIG. 3 is a block diagram of storage partition 300 for a participant data client, according to some embodiments.

According to an embodiment, once the requesting participant data client has determined the amount of storage needed, the requesting participant data client may partition this amount of storage from its available storage and designate this partition for use by the system as discussed in FIG. 3. In an embodiment, the requested data to be backed up as well as copied data from other participant data clients may be stored in the partitioned storage. In an embodiment, data stored in the partitioned storage may be encrypted.

In an embodiment, once the requesting participant data client's storage has been partitioned, the data backup parameters may be sent to coordinating server 102.

At 206, the requesting participant data client may receive data client availability parameters. The data client availability parameters may comprise, times of day, days, weeks, months, specific times, or any combination thereof, that the requesting data client is available for data backup. The data client availability parameters may be received as gestures on a touchscreen, strokes on a key board, text, mouse clicks, mouse drags, interactions with a user interface, or any combination thereof—to name a few examples. Once the requesting participant data client receives the data client availability parameters, it may determine a data client availability based on the data client availability parameters. The data client availability may comprise the times that the requesting participant data client is available for data backup.

According to an embodiment, the requesting participant data client may determine data client availability based on the historic usage of the requesting participant data client. The historic usage may comprise the times of day, days, weeks, months, or specific times that the requesting participant data client has been available to the network, used, powered on, or any combination thereof—to name a few examples.

In an embodiment, once the requesting participant data client determines the data client availability, the data client availability may be sent to coordinating server 102.

At 208, coordinating server 102 may determine if the requesting participant data client is available for data backup based on the data client availability. For example, coordinating server 102 may receive a data client availability comprising data that the requesting participant data client is available for data backup on Sundays. Coordinating server 102 may then determine, on a Monday, that participant data is not available for data backup. If the coordinating server 102 determines that the requesting participant data client is available for data backup then the system may move to 210. Otherwise 208 is repeated.

In an embodiment, coordinating server 102 may determine if the requesting participant data client is available after a delay from receiving the data client availability. The delay may comprise seconds, minutes, hours, days, weeks, months, or any combination thereof.

According to an embodiment, coordinating server 102 may determine if the requesting participant data client is available at specified intervals of time. These intervals of time may comprise seconds, minutes, hours, days, weeks, months, or any combination thereof.

Figure 4:
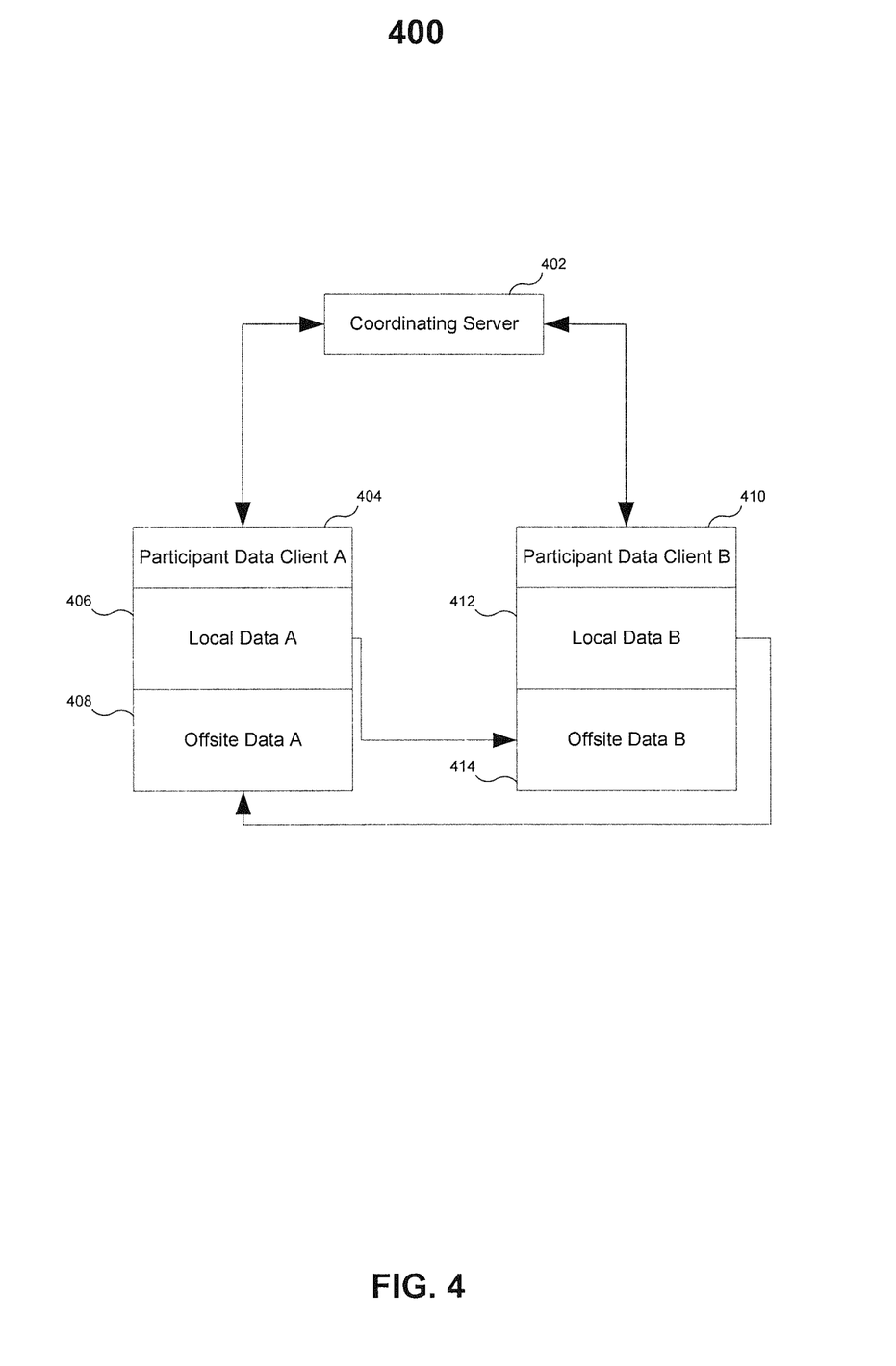
FIG. 4 is a block diagram of communications between coordinating server 102 and participant data clients 104, according to some embodiments.

At 210, coordinating server 102 may initiate peer-to-peer communication between the requesting participant data client and other participant data clients in the system to backup the requested files on the other participant data clients as discussed in FIG. 4.

According to an embodiment, coordinating server 102 may chose which of the other participant data clients to initiate peer-to-peer communication for based on the what participant data clients have previously partitioned data for use by the system, the physical locations of the participant data clients, the amount of available storage of the participant data clients, the availability of the participant data clients, or any combination thereof—to name a few examples.

FIG. 3 is a block diagram of storage partition 300 for a participant data client, according to some embodiments.

In an embodiment, storage partition 300 may comprise storage partitioned from the available storage of a participant data client as discussed in FIG. 2. According to an embodiment, the size of storage partition 300 may be calculated by the following equation:

Partition Size=(Size of data requested to be backed up)*(number of backups requested+1)

For example, participant data client A 104A may request that 100 GB is to be backed up 4 times by the system. Using EQ3, participant data client would create a storage partition of 500 GB, or 100*(4+1).

According to an embodiment, local data 302 may comprise data that a participant data client has requested to be backed up by the system. For example, participant data client A 104A may have requested that 100 GB be backed up by the system. After the storage is partitioned, the 100 GB requested to be backed up may be stored in the partitioned storage as local data 302.

In an embodiment, offsite data A 304, B 306, and C 308 may comprise data copied (backed up) from other participant data clients. In an embodiment, this data is copied to the partition when coordinating server 102 initiates peer-to-peer communications between participant data clients as discussed in FIG. 2.

For example, offsite data A 304 may comprise data backed up from participant data client B 104B, offsite data B 306 may comprise data backed up from participant data client C 104C, and offsite data C 308 may comprise data backed up from participant data client D 104D.

FIG. 4 is a block diagram communications between coordinating server 102 and participant data clients 104, according to some embodiments.

According to an embodiment coordinating server 402 may send a peer-to-peer initialization to participant data client A 404 and participant data client B 410. Participant data client A 404 may comprise a storage partition comprising local data A 406 and offsite data 408 and participant data client B 410 may comprise a storage partition comprising local data B 412 and offsite data B 414. The initialization may comprise which participant data clients are to participate in peer-to-peer communications, the amount of data to be backed up, the specific data to be backed up, or any combination thereof—to name a few examples. For example, coordinating server 402 may send a peer-to-peer initialization to participant data client A 404 and participant data client B 410 comprising data identifying that participant data client A 404 and participant data client B 410 are to communicate, 50 GB from participant data client A 404 are to be backed up on participant data client B 410, and 100 GB from participant data client B 410 are to be stored on participant data client A 404.

In an embodiment, when a participant data client receives a peer-to-peer initialization from coordinating server 402, the participant data client may transfer a copy of data stored in local data to a second participant data client to be stored in the offsite data of the second participant data client based on the peer-to-peer initialization. Thus resulting in the data being backed up on the second participant data client.

For example, participant data client A 404 may receive data identifying that participant data client A 404 and participant data client B 410 are to communicate, 50 GB from participant data client A 404 are to be backed up on participant data client B 410, and 100 GB from participant data client B 410 are to be stored on participant data client A 404. In response, participant data client A 404 may transfer a copy the 50 GB from local data A 406 to participant data client B 410. Participant data client B 410 may then store the 50 GB transferred in offsite data B 414.

Likewise, participant data client B 410 may receive data identifying that participant data client A 404 and participant data client B 410 are to communicate, 50 GB from participant data client A 404 are to be backed up on participant data client B 410, and 100 GB from participant data client B 410 are to be stored on participant data client A 404. In response, participant data client B 410 may transfer a copy the 100 GB from local data B 412 to participant data client A 404. Participant data client A 404 may then store the 100 GB transferred in offsite data A 408.

Figure 5:
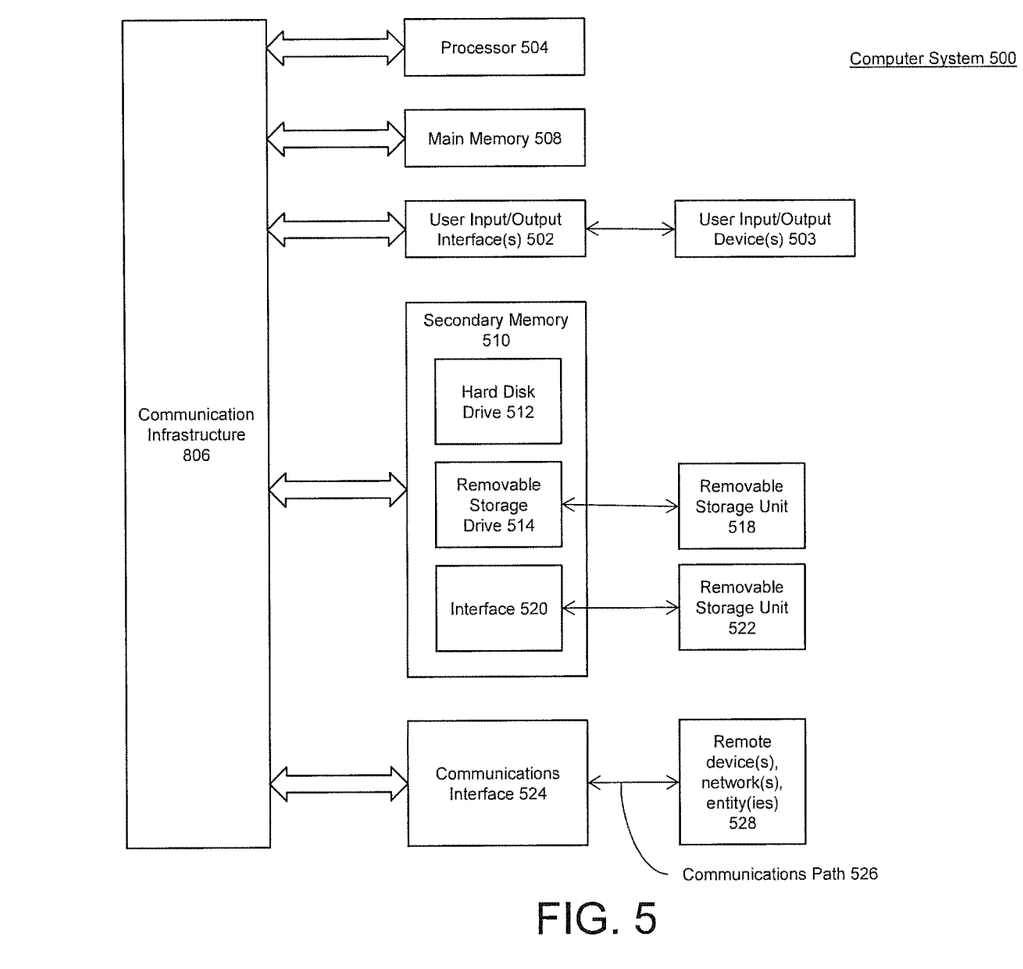
FIG. 5 is an example computer system useful for implementing various embodiments.

Computer system 500 includes one or more processors (also called central processing units, or CPUs), such as a processor 504. Processor 504 is connected to a communication infrastructure or bus 506.

One or more processors 504 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 also includes user input/output device(s) 503, such as monitors, keyboards, pointing devices, etc., that communicate with communication infrastructure 506 through user input/output interface(s) 502.

Computer system 500 also includes a main or primary memory 508, such as random access memory (RAM). Main memory 608 may include one or more levels of cache. Main memory 508 has stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 includes a computer usable or readable storage device having stored thereon computer software (control logic) and/or data. Removable storage unit 518 may be a floppy disk, magnetic tape, compact disk, DVD, optical storage disk, and/ any other computer data storage device. Removable storage drive 514 reads from and/or writes to removable storage unit 518 in a well-known manner.

According to an exemplary embodiment, secondary memory 510 may include other means, instrumentalities or other approaches for allowing computer programs and/or other instructions and/or data to be accessed by computer system 500. Such means, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 enables computer system 500 to communicate and interact with any combination of remote devices, remote networks, remote entities, etc. (individually and collectively referenced by reference number 528). For example, communication interface 524 may allow computer system 500 to communicate with remote devices 528 over communications path 526, which may be wired and/or wireless, and which may include any combination of LANs, WANs, the Internet, etc. Control logic and/or data may be transmitted to and from computer system 500 via communication path 526.

In an embodiment, a tangible apparatus or article of manufacture comprising a tangible computer useable or readable medium having control logic (software) stored thereon is also referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), causes such data processing devices to operate as described herein.

Based on the teachings contained in this disclosure, it will be apparent to persons skilled in the relevant art(s) how to make and use embodiments of the invention using data processing devices, computer systems and/or computer architectures other than that shown in FIG. 5. In particular, embodiments may operate with software, hardware, and/or operating system implementations other than those described herein.

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, blocks, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

What is claimed is:

1. A method, comprising:
    receiving, by at least one processor, a data backup request from a first data client of a plurality of data clients, wherein the data backup request includes a data size of data to be backed up according to the data backup request and a quantity of copies to be made of the data to be backed up;
    determining, by the at least one processor, that the first data client comprises storage configured with a partition having available partition space to accept an amount of data from the plurality of data clients; and
    issuing, by the at least one processor, a peer-to-peer initialization request to the first data client and to a second data client of the plurality of data clients in order to store the data from the first data client on the second data client responsive to the data backup request, wherein the issuing is permitted based on the available partition space being at least the data size of the data to be backed up times one more than the quantity of copies to be made;

wherein the first and second data clients are configured to establish peer-to-peer communications between the first and second data clients in response to the peer-to-peer initialization request.

2. A system, comprising:

a memory;

and at least one processor coupled to the memory and configured to:

receive a data backup request from a first data client of a plurality of data clients, wherein the data backup request includes a data size of data to be backed up according to the data backup request and a quantity of copies to be made of the data to be backed up;

determine that the first data client comprises storage configured with a partition having available partition space to accept an amount of data from the plurality of data clients; and issue a peer-to-peer initialization request to the first data client and to a second data client of the plurality of data clients in order to store the data from the first data client on the second data client responsive to the data backup request, wherein the issuing is permitted based on the available partition space being at least the data size of the data to be backed up times one more than the quantity of copies to be made;

wherein the first and second data clients are configured to establish peer-to-peer communications between the first and second data clients in response to the peer-to-peer initialization request.

3. A tangible, non-transitory computer-readable device having instructions stored thereon that, when executed by at least one computing device, causes the at least one computing device to perform operations comprising:

receiving a data backup request from a first data client of a plurality of data clients, wherein the data backup request includes a data size of data to be backed up according to the data backup request and a quantity of copies to be made of the data to be backed up;

determining that the first data client comprises storage configured with a partition having available partition space to accept an amount of data from the plurality of data clients; and issuing a peer-to-peer initialization request to the first data client and to a second data client of the plurality of data clients in order to store the data from the first data client on the second data client responsive to the data backup request, wherein the issuing is permitted based on the available partition space being at least the data size of the data to be backed up times one more than the quantity of copies to be made;

wherein the first and second data clients are configured to establish peer-to-peer communications between the first and second data clients in response to the peer-to-peer initialization request.

4. The method of claim 1, further comprising:

determining, by at least one processor, that the first data client is available.

5. The method of claim 1, further comprising:

selecting, by at least one processor, the second data client based upon a physical location of the second data client.

6. The method of claim 1, further comprising:

authorizing, by at least one processor, the first data client.

7. The method of claim 1, wherein the second data client has been previously authorized.

8. The system of claim 2, the at least one processor further configured to:

determine that the first data client is available.

9. The system of claim 2, the at least one processor further configured to:

select the second data client based upon a physical location of the second data client.

10. The system on claim 2, the at least one processor, further configured to:

authorize the first data client.

11. The non-transitory computer-readable device of claim 3, the operations further comprising:

determining that the first data client is available.

12. The non-transitory computer-readable device of claim 3, the operations further comprising:

selecting the second data client based upon a physical location of the second data client.

13. The non-transitory computer-readable device of claim 3, wherein the second data client has been previously authorized.

14. The method of claim 4, wherein the peer-to-peer initialization request is issued when the first data client is determined to be available.

15. The system of claim 8, wherein the peer-to-peer initialization request is issued when the first data client is determined to be available.

16. The non-transitory computer-readable device of claim 11, wherein the peer-to-peer initialization request is issued when the first data client is determined to be available.

17. The non-transitory computer-readable device of claim 12, the operations further comprising:

authorizing the first data client.

* * * * *